(12) United States Patent
DeBie (10) Patent No.: US 7,836,080 B2
(45) Date of Patent: Nov. 16, 2010

(54) USING AN ACCESS CONTROL LIST RULE TO GENERATE AN ACCESS CONTROL LIST FOR A DOCUMENT INCLUDED IN A FILE PLAN

(75) Inventor: Tod DeBie, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/615,807

(22) Filed: Dec. 22, 2006

(65) Prior Publication Data

US 2008/0155652 A1 Jun. 26, 2008

(51) Int. Cl.
*G06F 17/00* (2006.01)
(52) U.S. Cl. ..................................................... 707/785
(58) Field of Classification Search ................... None
See application file for complete search history.

(56) References Cited

U.S. PATENT DOCUMENTS

| | | | | |
|---|---|---|---|---|
| 5,276,901 A | * | 1/1994 | Howell et al. ................... | 707/9 |
| 5,410,667 A | | 4/1995 | Belsan et al. | |
| 5,692,178 A | * | 11/1997 | Shaughnessy .................. | 707/8 |
| 5,701,458 A | * | 12/1997 | Bsaibes et al. ................. | 707/9 |
| 5,813,009 A | | 9/1998 | Johnson et al. | |
| 5,892,900 A | * | 4/1999 | Ginter et al. ................... | 726/26 |
| 5,917,912 A | * | 6/1999 | Ginter et al. ................. | 713/187 |
| 5,921,582 A | | 7/1999 | Gusack | |
| 6,134,552 A | | 10/2000 | Fritz et al. | |
| 6,208,993 B1 | * | 3/2001 | Shadmon ..................... | 707/102 |
| 6,236,994 B1 | | 5/2001 | Swartz et al. | |
| 6,480,851 B1 | * | 11/2002 | Terek ............................. | 707/9 |
| 6,519,571 B1 | * | 2/2003 | Guheen et al. ................. | 705/14 |
| 6,553,365 B1 | | 4/2003 | Summerlin et al. | |
| 7,233,959 B2 | | 6/2007 | Kanellos et al. | |
| 7,478,088 B2 | | 1/2009 | Summerlin et al. | |

(Continued)

OTHER PUBLICATIONS

U.S. Appl. No. 11/317,712, filed Dec. 23, 2005, entitled "Dynamic Holds of Record Dispositions During Record Management", invented by T. DeBie.

(Continued)

*Primary Examiner*—Charles Rones
*Assistant Examiner*—Kurt Mueller
(74) *Attorney, Agent, or Firm*—David Victor; Konrad Raynes & Victor LLP (57) ABSTRACT

Provided are a method, system, and article of manufacture for using an access control list rule to generate an access control list for a document included in a file plan. A file plan includes a plurality of containers, wherein each container is capable of providing management information for documents in the file plan. An access control list rule indicates one of a plurality of access control list rules, wherein the access control list rules provide different ways to form file plan document access control lists using at least one of an access control list defined for a container and a pre-file plan document access control list indicating users enabled to access the document before the document is added to the file plan. A request to add a document to the file plan is received and a file plan document access control list is generated according to the defined access control list rule. The file plan document access control list is associated with the document in the file plan.

32 Claims, 5 Drawing Sheets

Container Information

U.S. PATENT DOCUMENTS

| | | |
|---|---|---|
| 7,594,082 B1 | 9/2009 | Kilday et al. |
| 2002/0111960 A1 | 8/2002 | Irons et al. |
| 2002/0161602 A1* | 10/2002 | Dougherty et al. ............. 705/1 |
| 2003/0041198 A1* | 2/2003 | Exton et al. ................. 710/200 |
| 2003/0088784 A1* | 5/2003 | Ginter et al. ................ 713/189 |
| 2003/0130993 A1* | 7/2003 | Mendelevitch et al. ......... 707/3 |
| 2003/0195866 A1* | 10/2003 | Long et al. ..................... 707/1 |
| 2003/0200234 A1* | 10/2003 | Koppich et al. ............ 707/203 |
| 2003/0227487 A1* | 12/2003 | Hugh ......................... 345/777 |
| 2003/0229623 A1* | 12/2003 | Chang et al. ................... 707/3 |
| 2004/0225730 A1 | 11/2004 | Brown et al. |
| 2005/0102297 A1* | 5/2005 | Lloyd et al. ................ 707/100 |
| 2005/0165734 A1 | 7/2005 | Vicars et al. |
| 2005/0171914 A1 | 8/2005 | Saitoh |
| 2005/0216467 A1* | 9/2005 | Urakawa et al. ............... 707/9 |
| 2005/0216524 A1 | 9/2005 | Gomes et al. |
| 2005/0262132 A1* | 11/2005 | Morita et al. ............... 707/102 |
| 2006/0085245 A1 | 4/2006 | Takatsuka et al. |
| 2006/0085374 A1 | 4/2006 | Mayes et al. |
| 2006/0101019 A1* | 5/2006 | Nelson et al. .................. 707/9 |
| 2006/0149735 A1 | 7/2006 | DeBie et al. |
| 2006/0173932 A1* | 8/2006 | Cortright et al. ............ 707/204 |
| 2006/0230044 A1 | 10/2006 | Utiger |
| 2006/0288050 A1* | 12/2006 | Wilson ....................... 707/202 |
| 2007/0005595 A1* | 1/2007 | Gafter ........................... 707/6 |
| 2007/0033191 A1* | 2/2007 | Hornkvist et al. .............. 707/9 |
| 2007/0088585 A1 | 4/2007 | Maguire |
| 2007/0088736 A1 | 4/2007 | DeBie |
| 2007/0130165 A1 | 6/2007 | Sjoblom et al. |
| 2007/0136397 A1 | 6/2007 | Pragada et al. |
| 2007/0220001 A1* | 9/2007 | Faden ........................... 707/9 |
| 2007/0226320 A1* | 9/2007 | Hager et al. ................ 709/219 |
| 2007/0244899 A1* | 10/2007 | Faitelson et al. ............... 707/9 |
| 2008/0022361 A1* | 1/2008 | Bharadwaj et al. ............ 726/2 |
| 2009/0055397 A1* | 2/2009 | Man et al. ...................... 707/9 |
| 2009/0077087 A1* | 3/2009 | Urano et al. ................... 707/9 |

OTHER PUBLICATIONS

U.S. Appl. No. 11/401,994, filed Apr. 11, 2006, entitled "Managing Content Objects Having Multiple Applicable Retention Periods", invented by T. DeBie.

U.S. Appl. No. 11/615,816, filed Dec. 22, 2006, entitled "Applying Multiple Disposition Schedules to Documents", invented by T. DeBie.

U.S. Appl. No. 11/615,842, filed Dec. 22, 2006, entitled "File Plan Import and Sync Over Multiple Systems", invented by T. DeBie.

U.S. Appl. No. 11/615,853, filed Dec. 22, 2006, entitled Physical to Electronic Record Content Management, invented by T. DeBie.

* cited by examiner

RIO Information

USING AN ACCESS CONTROL LIST RULE TO GENERATE AN ACCESS CONTROL LIST FOR A DOCUMENT INCLUDED IN A FILE PLAN

BACKGROUND OF THE INVENTION

1. Field of the Invention

The present invention relates to a method, system, and program for using an access control list rule to generate an access control list for a document included in a file plan.

2. Description of the Related Art

Enterprise content management systems facilitate managing a variety of information/content (documents) and processes that use such information during the course of enterprise operations. Documents, as used herein, refer to any identifiable logical/physical units of information, including content and transactions generated by the enterprise. A document may comprise an electronic file, object, program, database, image, email, message, etc. or a physical item, such as a paper, file, cassette recording, model, etc. Documents stored in the content management system may not initially be managed as part of a records management system until they go through a "declaration" procedure that creates a corresponding record information object (RIO) for the document. Each RIO may include metadata and a reference to the declared document. The metadata describes/characterizes the declared document. The reference is, for example, a location of the document maintained in an electronic file system or database maintained in a computer-readable media. Alternatively, in the case of a physical document, the reference specifies a physical document location (e.g., a box number, a file cabinet, etc.) where the document is located. Once declared as a record, a document is managed/accessed via the content management system and access to the declared document takes place via the content management system.

Other embodiments may not use the RIO/reference model and may instead directly attach record information or metadata to the document or object itself or use other means to track and/or manage records.

The scope of content represented by RIOs is not limited to any particular type of document form or location. A variety of document types are potentially referenced by the RIOs of the records manager. Such document types include, by way of example: formal documents such as permits, invoices, tax records, patents, contracts, claims, manuals etc; informal documents such as email messages (and attachments), text messages, meeting notes, etc.; multimedia content such as audio, video files; and physical containers such as file boxes, cabinets, folders, etc. The documents referenced by the RIOs are potentially stored in a variety of forms and locations. For example, electronic documents including images, text files, forms, etc. are potentially stored in file systems and databases. Physical documents referenced by RIOs are potentially stored in cabinets, boxes, file folders, etc.

After declaring a document, the associated RIO is maintained in an electronic object storage facility referred to as a "file plan object store" including one or more "file plans". In certain cases, file plans for documents may be maintained without a file plan object store. Each file plan comprises an outline/definition for record management based upon a hierarchically arranged set of categories (classes/subclasses) and containers for classifying/organizing/maintaining the RIOs and their associated declared documents. A known file plan arrangement for storing records includes the following containers: categories/sub-categories, record folders, and record volumes. In addition to defining a taxonomy of document types declared within the system, the file plan supports specifying management rules for RIOs placed within particular document categories and sub-categories. Such rules include user role-based access/permissions to RIOs and their associated documents, and defining access control lists and access control list rules, etc. Thus, the known file plan structure can be visualized as a hierarchical tree structure where nodes potentially specify distinct containers (e.g., category or container of categories). Each category within the file plan potentially specifies a set of properties and lifetime document management rules for associated document records.

When a document is declared or added to the file plan, and the RIO added to a container in the file plan, there are different ways to determine an access control list of users and their level of access to a document added to the file plan. An access control list comprises a list of users or groups of users enabled access to one or more documents and a level of access for each user or groups of users, such as read-only, read-write, modify properties, etc. In one implementation, the access control list setting is copied from the file plan container to the RIO. For instance, if a RIO is added to a file plan container that is defined to have an access control list of "Group A read only" and "Group B non-access", then the document or RIO in the file plan will inherit the security level defined for the container in which the RIO/document is included. In an alternative technique, the RIO in the file plan may have an access control list comprising the access control list for the document before it was added to the file plan.

There is a need in the art for improved techniques for determine the security level or access control list for a document added to a file plan.

SUMMARY

Provided are a method, system, and article of manufacture for using an access control list rule to generate an access control list for a document included in a file plan. A file plan includes a plurality of containers, wherein each container is capable of providing management information for documents in the file plan. An access control list rule indicates one of a plurality of access control list rules, wherein the access control list rules provide different ways to form file plan document access control lists using at least one of an access control list defined for a container and a pre-file plan document access control list indicating users enabled to access the document before the document is added to the file plan. A request to add a document to the file plan is received and a file plan document access control list is generated according to the defined access control list rule. The file plan document access control list is associated with the document in the file plan.

DETAILED DESCRIPTION

Figure 1:
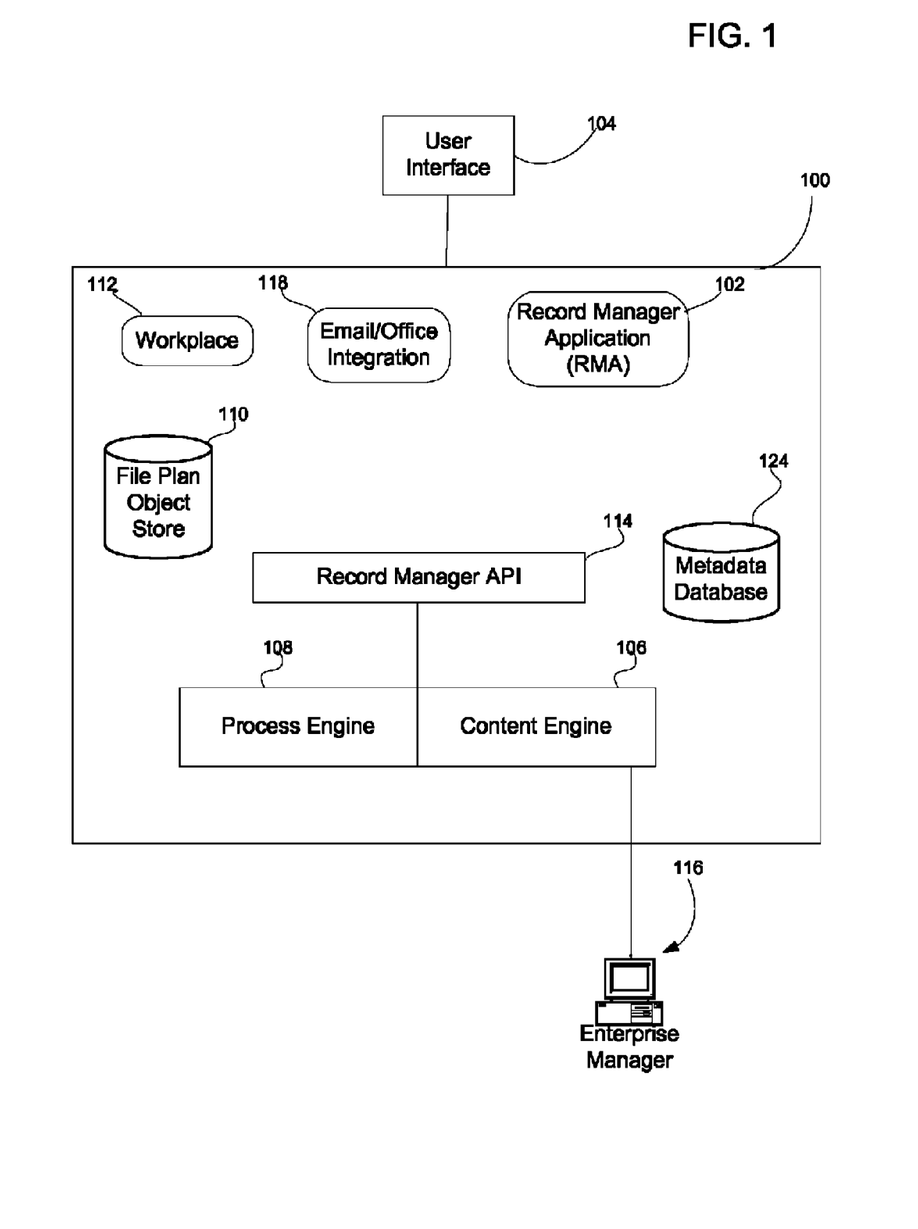
FIG. 1 illustrates of an embodiment of a computing environment.

FIG. 1 illustrates an embodiment of a record management system. The record management components execute on a server 100, such as a content server application platform 100, providing a user interface (e.g., Web server) to a variety of content management services via a set of hosted applications. The server 100 comprises an application platform including a collection of components that support records management functionality, including a records manager application 102.

The records manager application 102 (RMA) 102 provides an interface for creating file plans and associated sub-component containers including: categories, sub-categories, record folders, etc. The RMA 102 also processes user commands submitted via a user interface 104 (e.g., a web browser) that may run on a connected client system or the server 100 to enable a user to create and manage record information objects (RIOs) stored within the created file plans. In one embodiment, the RMA 102 does not directly manage documents associated with RIOs. Instead, the RMA 102 manages/administers the previous declared documents via calls to a content engine 106 and a process engine 108. The content engine 106 stores classes, properties and event subscriptions that define records management related data.

Figure 2:
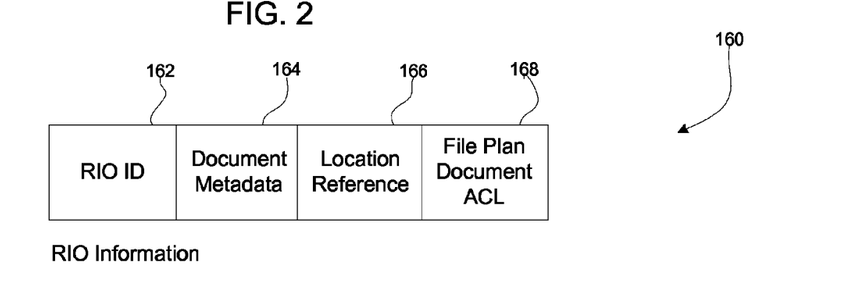
FIG. 2 illustrates an embodiment of information for a record information object.

During a declaration stage, an RIO is created for a new document, and the RIO is stored in a file plan object store 110 (see, FIG. 2). Declaring a new RIO is performed either manually or through automated processes that categorize a newly added document based upon characteristics associated with the document. In a workflow process, reaching a predefined point in a workflow may trigger an automatic declaration of a document being processed in the workflow. In the case of automatic declaration of a document, processes automatically analyze the document when it is saved/filed/submitted to the content engine 106. Such analysis involves extraction of, for example, a file system location, file metadata, content within the stored document (e.g., fields within an electronic form), etc. Upon detecting a particular event (e.g., detection of an event and/or expiration of a time period), the RMA 102 may automatically declare a document as a record or may initiate actions for disposing (e.g., transfer, review, destroy, archive, etc.) of the document, but not necessarily the corresponding RIO representing the document, from the system.

In one embodiment, the RMA 102 is provided as an "Advanced Author" tool invoked via a workplace application 112 that provides Web access to the functionality of the enterprise content management application. The RMA 102 includes a file plan editor functionality that facilitates defining a hierarchically arranged set (taxonomy) of containers within which RIOs (and their associated declared documents) are stored. RMA 102 further enables the administrator to define access control lists for each container (node) defined for a particular file plan.

The RMA 102 enables a user (e.g., a human records manager) via the user interface 104 to create and manage classification schemes (file plans) hierarchically arranging a set of RIOs corresponding to declared documents; create and manage access control lists and access control list rules; create and manage the record folders (and folder volumes) that are created under parent container nodes of the file plan; configure the system to specify content engine 106 object classes and properties to manage; create RIOs for managing physical boxes, folders and records; search for categories, folders and records within the file plan hierarchical tree structure; and run pre-defined searches against content engine 106 objects and audit information to generate reports.

In addition to records managers, privileged end users can use RMA 102 to perform tasks such as creating record folders and declaring paper records. In addition, the RMA 102 may be configured with preferences specified under the workplace 112 and leverages the workplace 112 user preference model where applicable. In one embodiment the RMA 102 leverages a records management application program interface (API) 114 providing utilities that support records management functionality. An enterprise manager application 116, which may reside on a separate enterprise manager system or on the server 100, provides an administration tool for managing and creating file plan object stores, defining security, and enabling auditing. The enterprise manager application 116 may enable the following functions: creating object stores and manage services; creating and managing object classes and setting security defaults; configuring auditing; customizing the system to enforce behavior that is customer specific (e.g., customizing events related to records management).

The workplace 112, in addition to providing an entry point into the RMA application 102, provides an interface that end-users and records managers use to capture documents and declare RIOs; declare existing documents as RIOs; define access control lists for containers; search for particular RIOs and print search results to generate basic reports; save user favorites (preferences) to aid in classification; and view record content.

Advanced users, records managers and integrators use the "advanced" tools of the workplace 112 such as the process designer and entry template designer to perform the following functions: create document information entry templates that include steps to automate the declaration process; create and modify access control lists; integrate record capture and declaration capability in custom processes; and create custom searches and publishing templates.

An email/office software integration application 118 facilitates declaring mail and other office application documents to be managed in the file plan. Additional functionality provided for records management includes the automated capture of email transmission data as well as support for capturing attachments as separate documents that are linked to the message body.

The content engine 106 provides the repository services for storing file plans and records and is responsible for enforcing security and auditing. The content engine 106 includes a set of application program interfaces that support administering declared/registered documents within the system. The interfaces of the content engine 106 are called by a variety of applications/components of the content management server application platform 100 to implement a variety of functions/services including, in addition to the aforementioned access control list actions, the following: object repository, content storage, content retrieval, version management, relation management, security, content classification, event notifications/subscriptions, document lifecycle management, content searches, etc.

In alternative embodiments, there may be no content engine, and the RMA or file system may manage access to files in the file plan.

The process engine 108 provides workflow services that support records management processes/actions. The actions include process execution, process routing, rules management, process simulation and modeling, and workflow analysis. The process engine 108 may invoke and run record management operations.

The server 100 may further include a metadata database 124 having metadata for documents declared in the file plan. In one embodiment, the metadata database 124 may store the RIO information 160.

FIG. 2 illustrates an embodiment of information included in an RIO 160, including an RIO identifier 162; document metadata 164 providing information on the document represented by the RIO, such as the document type, attributes of the document, and document content; a location reference 166 indicating the location of the document or object represented by the RIO; and a file plan document access control list indicating users allowed to access the document represented by the RIO in the file plan and a level of access for the users or groups included in the access control list, e.g., read, read/write, etc. The document referenced by the location reference 166 may comprise an electronic document, program or object. In such case, the location reference 166 provides the logical address that may be used to access the represented document. Alternatively, the document referenced by the location reference 166 may comprise a physical item. In such case, the location reference 166 indicates a physical location, such as floor, building, shelf, box, etc.

For instance, the RIO may represent documents comprising word processor documents, email messages, and graphics files; physical records, such as paper records, videotapes, portable storage media; vital records required for meeting operational responsibilities during an enterprise-wide emergency; permanent records identified as having sufficient historical or other value to warrant continued preservation by the organization beyond the time it is normally required for administrative, legal, or fiscal purposes.

Figure 3:
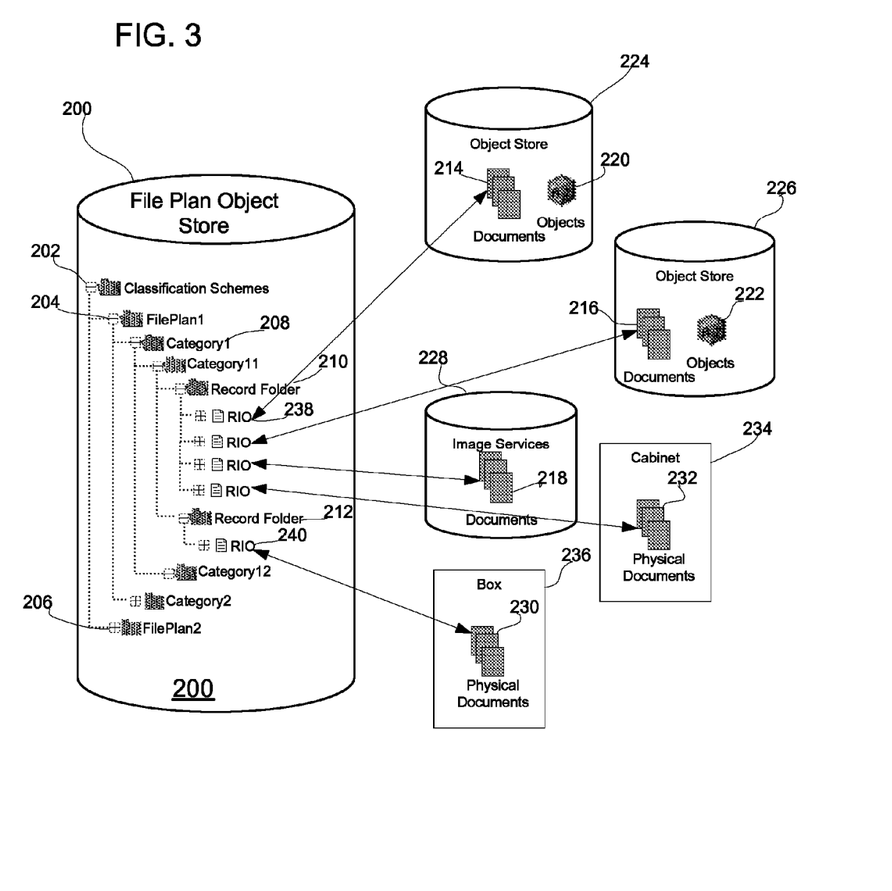
FIG. 3 illustrates an embodiment of a file plan object store.

FIG. 3 illustrates an embodiment of a file plan object store 200 comprising hierarchically arranged containers, where each container in the hierarchy may include other descendent containers, e.g., file plans, folders, record folders, categories, etc., and RIOs. The hierarchical arrangement of containers in file plans 204 and 206 may be implemented in the directories of a hierarchical file system, where each container comprises a folder in a directory, sharing a root node, such as the classification schemes 202. In one embodiment, the highest level node in the file plan object store 200 comprises a classification scheme node 202. At a next level, a set of file plans 204, 206 are each assigned to separate nodes. Each file plan defines an organization of records. Each file plan 204, 206 (e.g., FilePlan I) defines a hierarchy for storing RIOs such that their context is preserved. For example, in one embodiment a file plan hierarchy may reflect business functions of an enterprise. A record category (e.g., Category1 208) provides a first level of organization of RIOs under a file plan node of the exemplary hierarchical document record organization structure. Record categories are created to classify records based on functional categories. Examples of typical descriptive categories within a business enterprise are "Human Resources", "Accounting", "R&D", "Legal", "Marketing", etc. The record categories potentially contain either a sub-category container (e.g., Category11, Category 12) or a record folder container. Sub-category containers hold other sub-categories or record folders. Record folders contain actual RIOs 160.

A record folder 210, 212 serves as a container/collection of related RIOs. Record folders are used to manage RIOs according to retention periods, disposition events, holds, and security policies specified by their associated containers. The RIOs location references 166 (FIG. 2) may reference electronic documents 214, 216, 218 and objects 220, 222 (e.g., databases, programs, etc.) stored in electronic storage media in object stores 224, 226 or image services 228. RIOs may also reference physical documents or items 230, 232 stored in a physical location, such as a cabinet 234 or box 236. Examples of physical documents stored in boxes 236 and cabinets 234 include large building plans, videotapes, storage devices, books, hard copies, etc. The cabinet 234 and box 236 constructs provide mechanisms to model physical entities that contain other physical entities. For example, a "warehouse" contains "shelves" that contain "boxes" that contain the aforementioned physical folders. A box construct may contain another box, a physical folder, or a record. Hybrid folders are used as containers for a collection of related electronic and physical records.

The RIO nodes, e.g., 238, 240, in the file plan 200 reference and represent RIOs 160. The RIO nodes 238, 240 may include the RIO information 160 or a reference to an RIO object in the metadata database 124 or other location. An RIO may inherit file management rules, such as access control lists and security levels, from the immediate record folder 210, 212 in which it is included.

In one embodiment, when the document is declared in the file plan and assigned to a container, the RIO, e.g., 238 in the container may comprise a pointer or identifier, e.g., record identifier, to an RIO database object in the metadata database 124. The RIO record in the database 124 may include a pointer to one or more other rows in the database 124 including the RIO information, such as the document metadata 164, location reference 166, and file plan document access control list (ACL) 168. The file plan document ACL 168 indicates the security or groups of users and their level of access to the document and the document metadata, e.g., RIO, in the file plan.

In an alternative embodiment, the RIO database record addressed in the container, e.g., 210, may include all the RIO information 160. In an alternative embodiment, when declaring the document into a file plan, the document itself may be added to the container to which it is assigned, where the hierarchical file plan is implemented in a file system directory with the containers as folders. In such embodiments, the metadata database 124 may store the metadata for a document in the container that may be accessed using a document identifier, such as the document name, etc. In such embodiments, management operations, such as processes that need to process and access the document metadata, may access the metadata from the metadata database 124.

Figure 4:
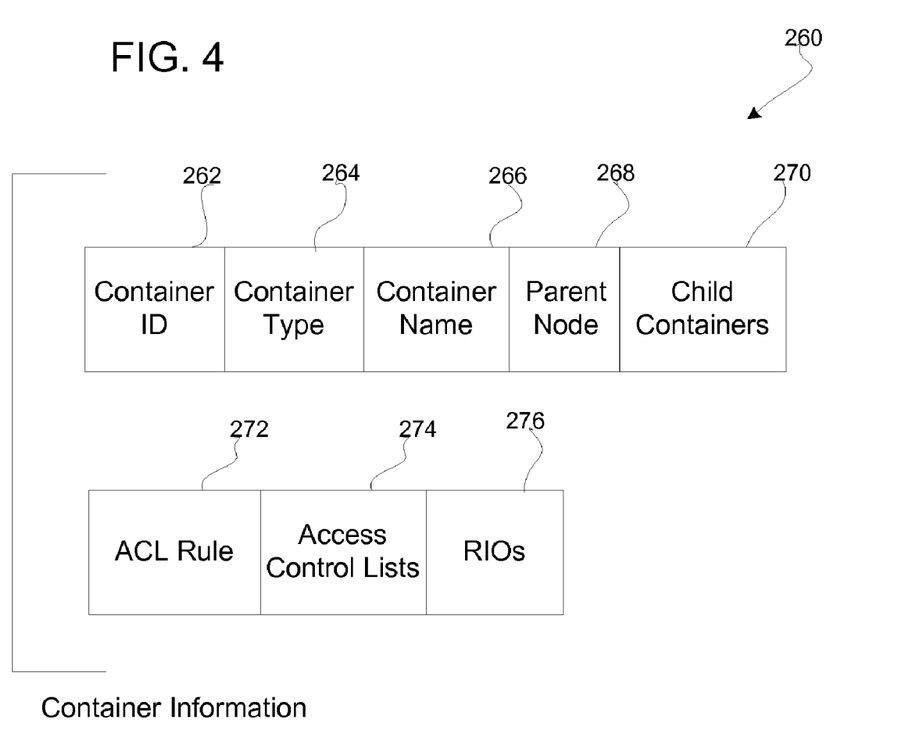
FIG. 4 illustrates an embodiment of information for a container in a file plan.

FIG. 4 illustrates an embodiment of container information 260 maintained for each container generated in a file plan. As discussed a container may comprise a classification scheme, file plan, category, record folder, or other logical subdivision of RIOs. Further, in embodiments where the hierarchical file plan is implemented in a hierarchical file system, the container may comprise a folder or directory in the file system. The container information 260 includes:

container type field 262 indicating whether the container comprises a file plan, category, a sub-category, a record folder, etc.

container identifier (ID) 264 indicating a unique ID of the container.

container name field 266 comprising a name associated with the container node (e.g., "Category1").

parent node field 268 indicating a direct parent node/container for the container in the file plan hierarchy.

child containers 270 comprising a list of all children containers (if any) within the container.

Access control list (ACL) rule 272 an algorithm or process for determining a file plan document access control list 168 (FIG. 2) for the document declared and included in the file plan, which may be based on access control lists defined for the container to which the document is assigned, ancestor containers including the container to which the document is assigned, and/or users having access to the document before being added to the file plan.

access control lists 272 if any, associated with the container, where each access control list provides a group of users and their level of access for the container setting and/or records included in the container. In certain implementations, there may be a container access control list providing the access for groups of users to the container settings and a document access control list providing the access for groups of users to documents or RIOs included in the container.

RIOs 276: a list of RIOs or documents included within the container. If the documents are stored in the containers, then the field 278 may include a reference to the document in the container and/or the metadata in a database 124.

The access control list and security for a document declared in the file plan 200 and assigned to a container, may be determined according to the ACL rule 272 indicated in the container to which the document is added or a first ancestor container to the container, according to the hierarchy of containers, to which the document is added. The ACL rule 272 may indicate a single alternate security, make existing security read only, combine existing and location security, combine existing and alternate security, multiple alternates security, multiple alternates combined with existing users, etc. The term access control list (ACL) as used herein comprises an indication, in any security framework (e.g., access control framework, mandatory access control framework, discretionary access control framework, lattice based access control framework, etc.), of users and/or groups of users permitted access to a document and the level of permitted access (e.g., read-only, read-write, delete, etc.).

In the single alternate security, the container to which a document is assigned or an ancestor container to the container including the document or RIO, has two access control lists, a container access control list providing users and their level of access to modify and view settings for the container, such as the settings in the container information 260 (FIG. 4), and a document access control list indicating users and their level of access to apply to documents assigned to the container. The document access control list is used to determine a file plan document access control list for the document in the file plan.

In a rule for making existing security read-only, the documents assigned to the container have a pre-file plan document access control list indicating users permitted access to the document before being added to the file plan 200. The users in the pre-file plan document access control list may have read-only and/or read-write privileges to the document. The rule for making existing security read-only adds the users indicated in the pre-file plan document access control list to the file plan document access control list with read-only access permission. Thus, the users in the pre-file plan document access control list having read and write access to the document before the document is added to the file plan will have read-only access after the document is added to the file plan.

In a rule combining existing users and location security, a file plan document access control list 272 includes the access control list defined for the container to which the document is added and the users in the pre-file plan document access control list. The users in the pre-file plan document access control list may be provided with read-only access to the document in the file plan document ACL 168.

In a rule combining existing users and alternate security, the file plan document ACL 168 includes the document access control list defined for the container to which the document is added, as opposed to the container access control list for the container, and the users indicted in the pre-file plan document access control list. The users in the pre-file plan document access control list may be provided with read-only access to the document in the file plan document access control list 272.

In a multiple alternates rule, several access control lists may be defined for a container, where each access control list is associated with a document attribute, such as the document type. In such case, the file plan document ACL 168 for the document comprises the access control list that corresponds to the document attribute of the document.

In a rule combining multiple alternates and existing users, the file plan document ACL 168 includes the container access control list corresponding to the document attribute for the document and the users in the pre-file plan document access control list. The users in the pre-file plan document access control list may be provided with read-only access to the document in the derivative access control list.

In a dynamic rule, the document is interrogated to determine an access control list based on the document content. For instance, if the document is a message, such as an email, then the access control list may comprise the users addressed in the email or message, e.g., in the "to" and "from" fields of the message.

Other alternate rule may include other possible combinations of the above described rules, including single alternate security, make existing users read only, multiple alternates, and dynamic.

In one embodiment, the content engine 106 maintains the access control list for a document and uses the pre-file plan document access control list or file plan document access control list to determine whether a user attempt to access a document is permitted. The file plan access control list used by the content engine 106 may be stored in the records management database 124 or a content engine database. In alternative embodiments, other components in the system may maintain and use the access control lists to determine whether access is permitted.

Figure 5A:
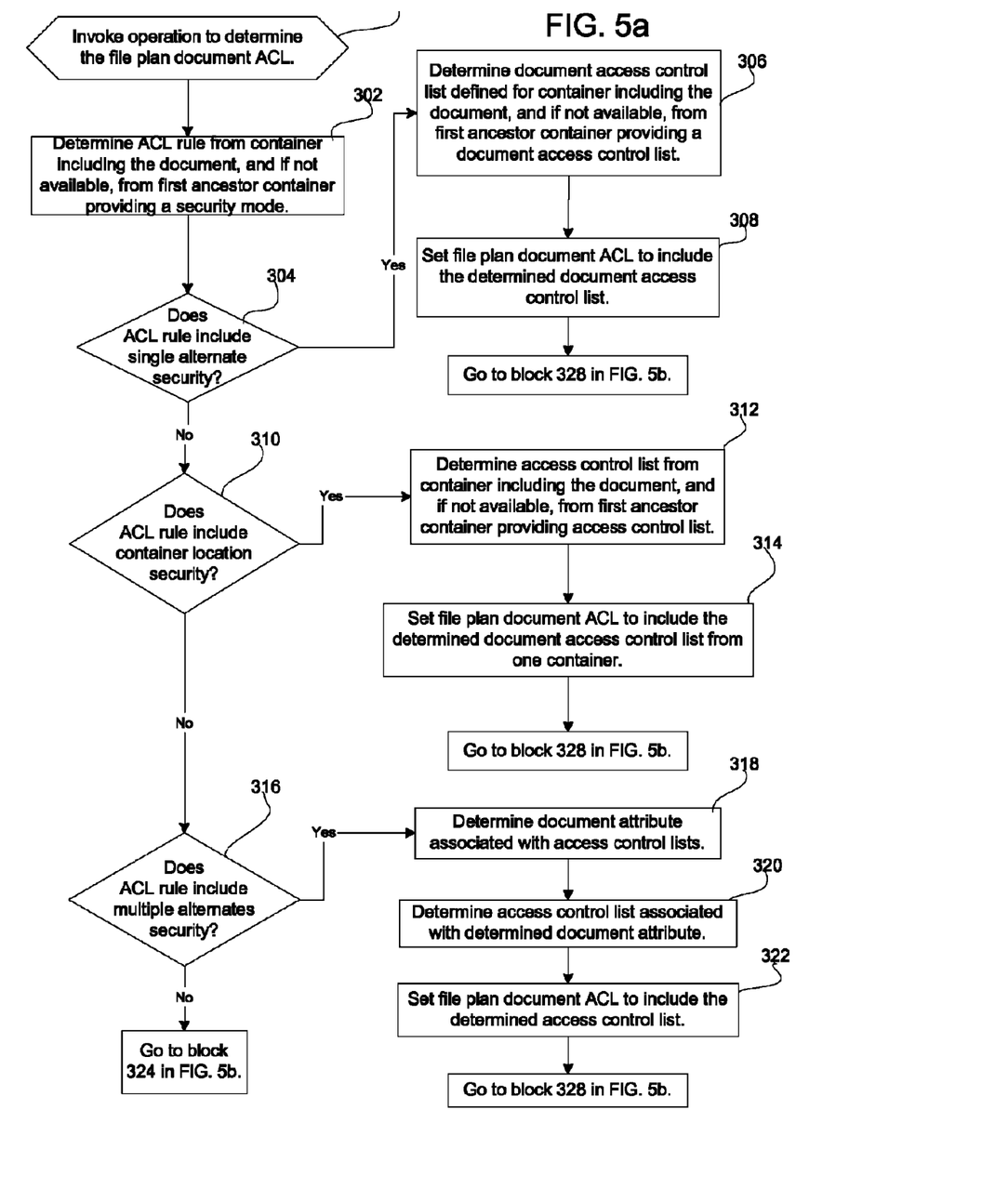
FIGS. 5a and 5b illustrate an embodiment of operations to determine a file plan document access control list to be used for the document in the file plan.
Figure 5B:
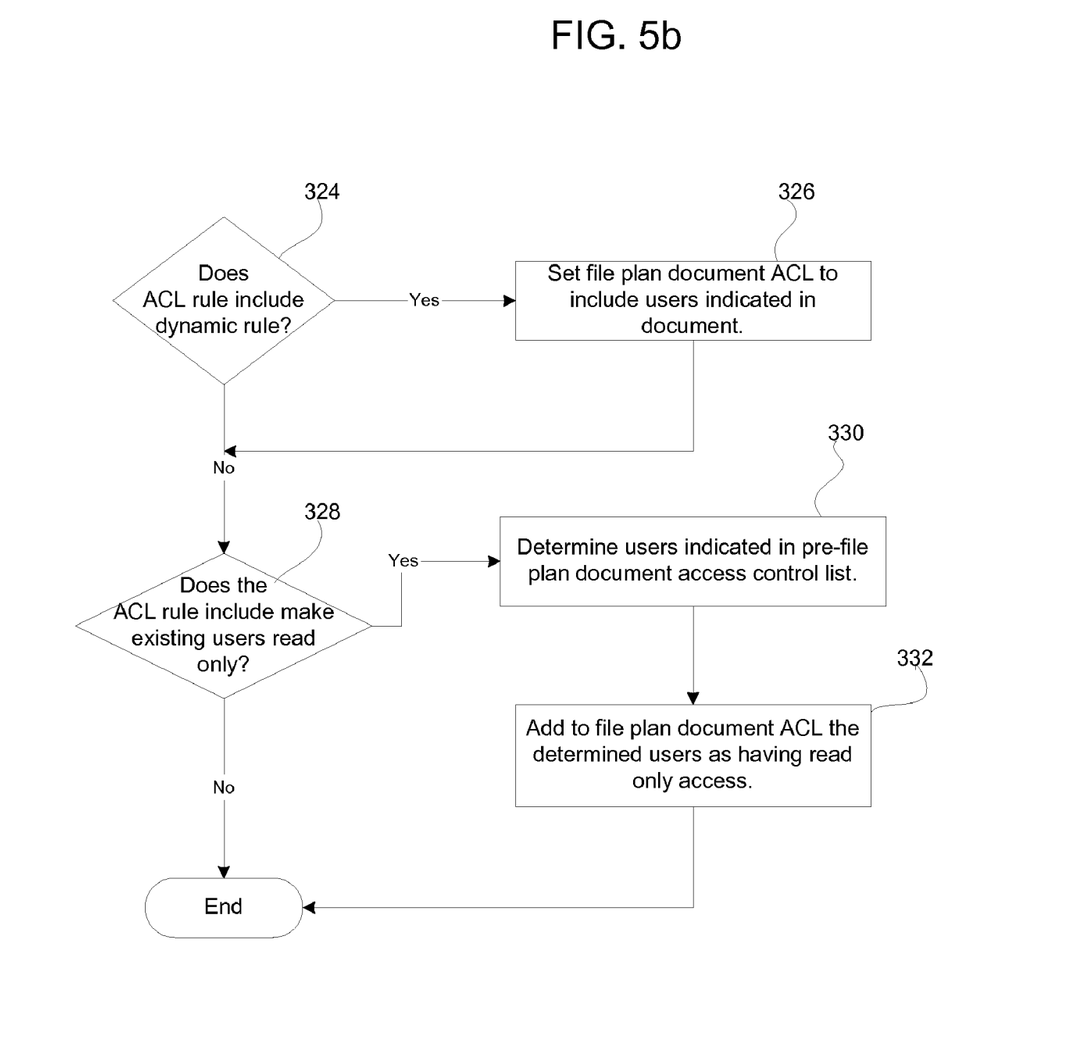

FIGS. 5a and 5b illustrates an embodiment of operations performed by the content engine 106 or other component in the server 100 to determine the file plan document access control list (ACL) 168 for a document in the file plan. This determination of the file plan document ACL 168 may be made when the document is declared in the file plan 200. Alternatively, the content engine 106 or other component may determine the file plan document ACL 168 when processing an access request to the document, where the file plan document ACL 168 may be recalculated for each session or access. Upon invoking (at block 300) the operation to determine the file plan document ACL 168, the content engine 106 (or other component) determines (at block 302) the ACL rule 272 (FIG. 4) from the container including the document, and if not available, from a first ancestor container in the hierarchy providing an ACL rule 272. If (at block 304) the ACL rule 272 indicates single alternate security, then the content engine 106 determines (at block 306) the document access control list (in field 274) defined for the container including the document, and if not available, from first ancestor container providing a document access control list. As discussed, with single alternate security, a container includes a container level control list and a document control list for documents included in the container or a child container of the container. The file plan document ACL 168 is set (at block 308) to include the determined document access control list. If (at block 310) the ACL rule 272 includes a location security mode, which means the container provides only a single document access control list, then the content engine 106 determines (at block 312) the document access control list defined for the container including the document, and if not available, from the first ancestor container, including the container including the document or RIO, in the hierarchy providing a document access control list. The file plan document ACL 168 is then set (at block 314) to include the determined document access control list from one container.

If (at block 316) the determined ACL rule 272 includes a multiple alternates security rule, then the content engine 106 determines (at block 318) a document attribute(s) associated with the access control lists for the container. The determined document attribute may come from the document metadata, e.g., RIO information 160, or content of the document. The content engine 106 determines (at block 320) the access control list associated with the determined document attribute and sets (at block 322) the file plan document ACL 168 to include the determined access control list.

If (at block 324) the determined ACL rule 272 includes the dynamic rule, then the content engine 106 sets (at block 326) the file plan document ACL 168 to include users indicated in document, such as users indicated in a message (e.g., in the "To" and "From" fields). Users indicated as recipients or senders of a message or document may be considered as users in the pre-file plan document access control list. From blocks 308, 314, 322 or 326, the content engine 106 may further determine (at block 328) whether the determined ACL rule 272 also specifies a make existing users read-only rule. If so, the users in the pre-file plan document access control list (i.e., enabled to access the document before the document is added to the file plan) are determined (at block 330) and the are added (at block 332) to the file plan document ACL 168 with read-only access to the document in the file plan.

Described embodiments provide a framework to allow for multiple access control lists from different sources and other information to be used to determine the file plan document access control list to apply to a document added to a file plan. This allows the administrator to flexibly define how an access control list for a document in a file plan will be determined.

Additional Embodiment Details

The described operations may be implemented as a method, apparatus or article of manufacture using standard programming and/or engineering techniques to produce software, firmware, hardware, or any combination thereof. The term "article of manufacture" as used herein refers to code or logic implemented in a medium, where such medium may comprise hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The computer readable medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

In certain embodiments, the file sets and metadata are maintained in separate storage systems and commands to copy the file sets and metadata are transmitted by systems over a network. In an alternative embodiment, the file sets and metadata may be maintained in a same storage system and the command to copy may be initiated by a program in a system that also directly manages the storage devices including the file sets and metadata to copy.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

FIGS. 2, 3, and 4 provide embodiments of information included in the RIO, file plan, and container. In alternative embodiments, the RIOs, file plan, and containers may include different or additional information.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
providing a file plan including a plurality of containers, wherein the containers provide management information for documents in the file plan, including:
information on relationships with other containers,
an identifier of files associated with the container,
at least one container access control list (ACL) indicating levels of user access to the container, and
an ACL rule used to generate a file plan document ACL for files being added to the container, wherein the file plan document ACL is used to determine user access to the document added to the file plan;
defining each of the ACL rules for the containers to indicate one of a plurality of ACL rules, wherein the ACL rules indicate different ways to generate a file plan document ACL using at least one of a container ACL defined for at least one container with which the document is associated and a pre-file plan document ACL indicating users enabled to access the document before the document is added to the file plan;
receiving a request to add a document to one of the containers in the file plan;
generating a file plan document ACL by processing the ACL rule, associated with the container to which the document is added, to use at least one of the container ACL defined for the container to which the document is added and the pre-file plan document ACL;
indicating the identifier of the added document with the container to which the document is added; and
associating the generated file plan document ACL with the management information for the document added to the file plan.

2. The method of claim 1, wherein one of the ACL rules indicates to include in the file plan document ACL the users indicated in the pre-file plan document ACL with read-only access to the document in the file plan, wherein at least one of the users in the pre-file plan document ACL had read and write access to the document in the pre-file plan document ACL, and wherein processing the defined ACL rule further comprises:
adding to the file plan document ACL users indicated in the pre-file plan document ACL to have read only access.

3. The method of claim 1, wherein a first container ACL defined for the container indicates users enabled to modify container settings and wherein a second container ACL defined for the container is intended for documents added to the file plan, wherein the ACL included in the file plan document ACL comprises the second container ACL.

4. The method of claim 1, wherein the defined ACL rule indicates to select one container ACL defined for the container to include in the file plan document ACL, and wherein processing the defined ACL rule further comprises:
processing document metadata for the document; and
selecting one container ACL defined for the container based on the document metadata.

5. The method of claim 4, wherein the container has different container ACLs associated with different types of documents, wherein processing the document metadata comprises determining a document type for the document in the file plan, and wherein the selected ACL comprises the ACL associated with the determined document type.

6. The method of claim 1, wherein the generated file plan document ACL includes the ACL defined for the container to which the document is added in the file plan.

7. The method of claim 1, wherein containers are arranged in a hierarchical relationship, wherein processing the ACL rule comprises including in the generated file plan document ACL:
one container ACL defined for the container including the document in response to determining that the container including the document is defined to have one container ACL; and
one ancestor container ACL defined for an immediate ancestor container to the container including the document in the hierarchical relationship in response to determining that the container including the document is not defined to have one container ACL.

8. The method of claim 1, wherein determining users in the pre-file plan document ACL comprises:
processing the document to determine users indicated in the document to include in the file plan document ACL.

9. The method of claim 8, wherein the document comprises an electronic message and wherein processing the document to determine users comprises determining users indicated in address fields of the electronic message.

10. The method of claim 6, wherein containers are arranged in a hierarchical relationship, further comprising:
determining the ACL rule defined for a first ancestor container to the container including the document in the hierarchical relationship in response to determining that the container including the document is not defined to have the ACL rule.

11. The method of claim 1, wherein the generated ACL access is stored in the management information for the file in the container.

12. The method of claim 1, wherein the management information for the document includes a location reference indicating a location where the document is stored.

13. A system, comprising:
a processor;
a computer readable storage medium, including:
a file plan including a plurality of containers, wherein the containers provide management information for documents in the file plan, including
information on relationships with other containers,
an identifier of files associated with the container,
at least one container access control list (ACL) indicating levels of user access to the container, and
an ACL rule used to generate a file plan document access control list for files being added to the container, wherein the file plan document ACL is used to determine user access to a document added to the file plan;

wherein the ACL rule indicates one of a plurality of ACL rules, wherein the ACL rules indicate different ways to generate a file plan document ACL using at least one of a container ACL defined for at least one container with which the document is associated and a pre-file plan document ACL indicating users enabled to access the document before the document is added to the file plan;

code executed by the processor to perform operations, the operations comprising:

receiving a request to add a document to one of the containers in the file plan;

generating a file plan document ACL by processing the defined ACL rule, associated with the container to which the document is added, to use at least one of the container ACL defined for the container to which the document is added and the pre-file plan document ACL;

indicating the identifier of the added document with the container to which the document is added; and associating the generated file plan document ACL with the management information for the document added to the file plan.

14. The system of claim 13, wherein one of the ACL rules indicates to include in the file plan document ACL the users indicated in the pre-file plan document ACL with read-only access to the document in the file plan, wherein at least one of the users in the pre-file plan document ACL had read and write access to the document in the pre-file plan document ACL, and wherein processing the defined ACL rule further comprises:

adding to the file plan document ACL users indicated in the pre-file plan document ACL to have read only access.

15. The system of claim 13, wherein a first container ACL defined for the container indicates users enabled to modify container settings and wherein a second container ACL defined for the container is intended for documents added to the file plan, wherein the ACL included in the file plan document ACL comprises the second container ACL.

16. The system of claim 13, wherein the defined ACL rule indicates to select one ACL defined for the container to include in the file plan document ACL, and wherein processing the defined ACL rule further comprises:

processing document metadata for the document; and selecting one container ACL defined for the container based on the document metadata.

17. The system of claim 16, wherein the container has different container ACLs associated with different types of documents, wherein processing the document metadata comprises determining a document type for the document in the file plan, and wherein the selected ACL comprises the ACL associated with the determined document type.

18. The system of claim 13, wherein the generated file plan document ACL includes the ACL defined for the container to which the document is added in the file plan.

19. The system of claim 13, wherein containers are arranged in a hierarchical relationship, wherein processing the ACL rule comprises including in the file plan document ACL:

one container ACL defined for the container including the document in response to determining that the container including the document is defined to have one container ACL; and one ancestor container ACL defined for an immediate ancestor container to the container including the document in the hierarchical relationship in response to determining that the container including the document is not defined to have one container ACL.

20. The system of claim 13, wherein determining users in the pre-file plan document access control list comprises:

processing the document to determine users indicated in the document to include in the file plan document ACL.

21. The system of claim 20, wherein the document comprises an electronic message and wherein processing the document to determine users comprises determining users indicated in address fields of the electronic message.

22. The system of claim 18, wherein containers are arranged in a hierarchical relationship, and wherein the operations further comprise:

determining the ACL rule defined for a first ancestor container to the container including the document in the hierarchical relationship in response to determining that the container including the document is not defined to have the ACL rule.

23. An article of manufacture comprising a computer readable storage medium including code executed to perform operations, the operations comprising:

providing a file plan including a plurality of containers, wherein the containers provide management information for documents in the file plan, including:

information on relationships with other containers, an identifier of files associated with the container, at least one container ACL indicating levels of user access to the container, and an ACL rule used to generate a file plan document ACL for files being added to the container, wherein the file plan document ACL is used to determine user access to a document added to the file plan;

defining each of the ACL rules for the containers to indicate one of a plurality of rules, wherein the ACL rules indicate different ways to generate a file plan document ACL using at least one of a container ACL defined for at least one container with which the document is associated and a pre-file plan document ACL indicating users enabled to access the document before the document is added to the file plan;

receiving a request to add a document to one of the containers in the file plan;

generating a file plan document ACL by processing the ACL rule, associated with the container to which the document is added, to use at least one of the container ACL defined for the container to which the document is added and the pre-file plan document ACL;

indicating the identifier of the added document with the container to which the document is added; and associating the generated file plan document ACL with the management information for the document added to the file plan.

24. The article of manufacture of claim 23, wherein one of the ACL rules indicates to include in the file plan document ACL the users indicated in the pre-file plan document ACL with read-only access to the document in the file plan, wherein at least one of the users in the pre-file plan document ACL had read and write access to the document in the pre-file plan document ACL, and wherein processing the defined ACL rule further comprises:

adding to the file plan document ACL users indicated in the pre-file plan document ACL to have read only access.

25. The article of manufacture of claim 23, wherein a first container ACL defined for the container indicates users enabled to modify container settings and wherein a second container ACL defined for the container is intended for documents added to the file plan, wherein the ACL included in the file plan document ACL comprises the second container ACL.

26. The article of manufacture of claim 23, wherein the defined ACL rule indicates to select one container ACL defined for the container to include in the file plan document ACL, and wherein processing the defined ACL rule further comprises:

processing document metadata for the document; and selecting one container ACL defined for the container based on the document metadata.

27. The article of manufacture of claim 26, wherein the container has different container ACLs associated with different types of documents, wherein processing the document metadata comprises determining a document type for the document in the file plan, and wherein the selected ACL comprises the ACL associated with the determined document type.

28. The article of manufacture of claim 23, wherein the generated file plan document ACL includes the ACL defined for the container to which the document is added in the file plan.

29. The article of manufacture of claim 23, wherein containers are arranged in a hierarchical relationship, wherein processing the ACL rule comprises including generated file plan document ACL:

one container ACL defined for the container including the document in response to determining that the container including the document is defined to have one container ACL; and one ancestor container ACL defined for an immediate ancestor container to the container including the document in the hierarchical relationship in response to determining that the container including the document is not defined to have one container ACL.

30. The article of manufacture of claim 23, wherein determining users in the pre-file plan document ACL comprises:

processing the document to determine users indicated in the document to include in the file plan document ACL.

31. The article of manufacture of claim 30, wherein the document comprises an electronic message and wherein processing the document to determine users comprises determining users indicated in address fields of the electronic message.

32. The article of manufacture of claim 28, wherein containers are arranged in a hierarchical relationship, further comprising:

determining the ACL rule defined for a first ancestor container to the container including the document in the hierarchical relationship in response to determining that the container including the document is not defined to have the ACL rule.

* * * * *